US012596847B2

(12) United States Patent
Martick

(10) Patent No.: US 12,596,847 B2
(45) Date of Patent: Apr. 7, 2026

(54) DECENTRALIZED ATTESTATIONS FOR SOFTWARE ARTIFACTS

(71) Applicant: SAP SE, Walldorf (DE)

(72) Inventor: Christian Martick, Brandenburg (DE)

(73) Assignee: SAP SE, Walldorf (DE)

( * ) Notice: Subject to any disclaimer, the term of this patent is extended or adjusted under 35 U.S.C. 154(b) by 159 days.

(21) Appl. No.: 18/634,739

(22) Filed: Apr. 12, 2024

(65) Prior Publication Data

US 2025/0322104 A1     Oct. 16, 2025

(51) Int. Cl.
G06F 21/64         (2013.01)
G06F 21/62         (2013.01)

(52) U.S. Cl.
CPC .......... G06F 21/64 (2013.01); G06F 21/6209 (2013.01)

(58) Field of Classification Search
CPC ....................................................... G06F 21/64
See application file for complete search history.

(56) References Cited

U.S. PATENT DOCUMENTS

| | | | | | |
|---|---|---|---|---|---|
| 11,349,670 | B1 * | 5/2022 | Miller | ..................... | G06F 21/64 |
| 11,513,782 | B1 * | 11/2022 | Landry | ................. | G06F 21/604 |
| 2018/0173871 | A1 * | 6/2018 | Toth | ..................... | H04W 12/126 |
| 2022/0244932 | A1 * | 8/2022 | Lapiduz | ................. | H04L 9/3247 |
| 2023/0011621 | A1 * | 1/2023 | Jakobsson | ............. | H04L 9/3213 |
| 2023/0045734 | A1 * | 2/2023 | Cui | ........................ | H04W 24/04 |
| 2023/0079773 | A1 * | 3/2023 | Fritz | ........................ | G06F 21/57 726/22 |
| 2023/0088197 | A1 * | 3/2023 | Cline | ..................... | G06F 21/57 713/187 |
| 2023/0274034 | A1 * | 8/2023 | Melara | .................... | G06F 21/57 726/17 |
| 2023/0334147 | A1 * | 10/2023 | Nunez Mencias | .. | G06F 11/3604 |
| 2024/0104192 | A1 * | 3/2024 | Kalle | ...................... | G06F 21/64 |
| 2024/0329953 | A1 * | 10/2024 | Cliffe | ..................... | G06F 8/433 |
| 2025/0139264 | A1 * | 5/2025 | Ni | ......................... | H04L 9/3268 |

* cited by examiner

*Primary Examiner* — Lynn D Feild
*Assistant Examiner* — Vladimir I Gavrilenko
(74) *Attorney, Agent, or Firm* — Fountainhead Law Group, PC

(57)                ABSTRACT

Embodiments describe techniques for validating the integrity and compliance of software artifacts through the use of attestations. An attestation manager is capable of retrieving an attestation file from storage, validating the software artifact and the attestation chain within the attestation, and optionally generate new attestations to add to the attestation chain when the software artifact and the attestation chain have been validated. A public-key encryption scheme may be applied to validate attestations while a fingerprint comparison scheme may be applied to validate the software artifact.

15 Claims, 10 Drawing Sheets

800 retrieving an attestation file from storage ~810 validating the software artifact ~820 validating the attestation chain in the attestation file ~830 generating a new attestation ~840 adding the new attestation to the attestation chain ~850

DECENTRALIZED ATTESTATIONS FOR SOFTWARE ARTIFACTS

BACKGROUND

Unless otherwise indicated herein, the approaches described in this section are not prior art to the claims in this application and are not admitted to be prior art by inclusion in this section.

As the scale and complexity of enterprise software environments continue to grow, there is an increasing need for ways to validate the integrity and compliance of software artifacts in a flexible, scalable, and secure manner. In the context of enterprise software, a software consumer may desire that software utilized has certain certifications or verifications of the efficacy and fitness. Since different software consumer may desire different certifications or verifications, and different third parties may be able to attest to different properties of the software, there is a need for a solution that for generating attestations that is both scalable and decentralized.

DETAILED DESCRIPTION

Figure 1:
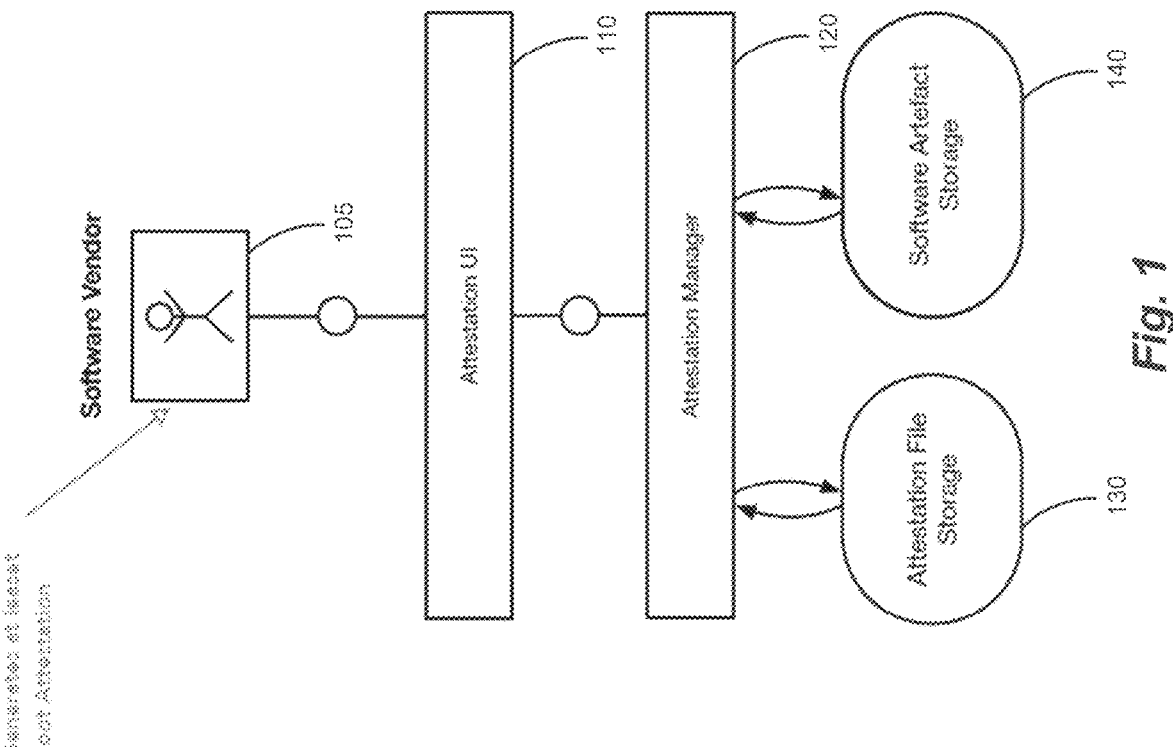
FIG. 1 illustrates a system for generating an attestation file according to some embodiments.
Figure 1:

Described herein are methods and apparatuses for validating the integrity and compliance of software artifacts through the use of attestations. An attestation confirms that an attestor has validated that a property is satisfied in a software artifact or a version of the software artifact, depending on the implementation details. Attesting to a software artifact or a version of the software artifact will be used interchangeably throughout the specification. In one example, the property may be a functional requirement such as a functional test attestation that attests to certain functionality within the version of the software artifact. For instance, functional test attestations may test the performance, accuracy, or speed of the software artifact. In another example, the property may be a business requirement such as a sustainability attestation where an attestor has validated that the software company's carbon footprint across operations is less than a requirement. In another example, the property may be a compliance requirement such as an export compliance attestation or GAAP attestation or GDPR attestation. In some embodiments, a software artifact may be associated with multiple attestation files where each attestation file includes one or more attestations. These multiple attestations are known as attestation chains and may be disseminated to customers on a need-to-know basis, thereby minimizing potential exposure of sensitive business information encoded in the software artifacts. For example, a software vendor may not want a customers to be aware that the software artifact has a GAAP attestation or a sustainability attestation because the customer does not care about these and sharing this information with the customer may be undesirable. In one embodiment, a customer may review the attestation files available to the customer for attestation chains that contain attestations that the customer would like to validate before using the software artifact. These requirements may be specified by the customer or the customer's company. Once an attestation file has been selected, the customer may validate all the attestations in the attestation file before using the software artifact. In another embodiment, an auditor may select an attestation file and validate all the attestations in the attestation file as part of an audit process.

In some embodiments, an attestation manager may be utilized to generate or modify attestation files. A software vendor may use the attestation manager to generate a root attestation for a given version of a software artifact. The root attestation may be saved in a new attestation file. Third parties (3P) attestors may then append their own attestations to existing attestations in an attestation file. This can result in a modified attestation file that contain a longer attestation chain or the creation of a new attestation file containing the longer attestation chain while preserving the original attestation file. Fingerprint encryption and public-key encryption schemes may be used to validate the software artifacts and the contents of the attestation file to ensure that nobody has tampered with the software artifact and the attestation file. A software consumer may validate the attestation chain in an attestation file prior to running the software artifact for the first time or whenever the software artifact is updated. In some embodiments, attestation manager may automatically delete attestation files that fail validation from storage to prevent them from being used in the future. In other embodiments, attestation files that fail validation may be flagged or marked so that attesting 3Ps, software consumer, or auditors are aware that the attestation file has previously failed validation. Both of these options may save time by removing or tagging bad attestation files in the system.

FIG. 1 illustrates a system for generating an attestation file according to some embodiments. The attestation file generated contains the root attestation, also known as the first attestation in the attestation chain. In one embodiment, the root attestation is generated by the software vendor who is attesting that a software artifact has not been tampered with. In some examples, the software vendor may also wish to add other attestations along with the root attestation. System 100 may be implemented in software and executed on a computing system or computing network, located locally or on the cloud. In one embodiment, system 100 may be deployed by a software vendor that is distributing a software artifact. In another embodiment, system 100 may be deployed by a third party that is offering attestation as a service to the software vendor.

System 100 includes attestation UI 110, attestation manager 120, attestation file storage 130, and software artifact storage 140. Software vendor 105 may interact with the attestation manager 120 through attestation UI 110. In one embodiment, attestation UI 110 may generate a graphical user interface for purposes of presenting information to software vendor 105 and receiving instructions or commands from software vendor 105. Attestation UI 110 may also transmit instructions or commands to attestation manager 120. Attestation manager 120 may be configured to retrieve attestation files from attestation files storage 130, to write attestation files to attestation files storage 130, and to retrieve software artifacts from software artifact storage 140, and to write software artifacts to software artifacts storage. Attestation manager 120 is also configured to analyze and generate attestation files. This can include validating existing attestations, generating new attestations to add to an existing attestation file, and generating new attestations to add to a new attestation file.

Attestation file storage 130 may be configured to store a plurality of attestation files. Each attestation file may include a unique attestation chain. Each attestation chain includes a root attestation and optionally additional attestations, where each attestation (the root attestation and the additional attestations) validates or attests that a software artifact satisfies a property. All of the attestations in the attestation chain attest to different properties but are associated with the same software artifact. For example, a first attestation file having a first attestation chain may attest to a first set of properties in the software artifact and a second attestation file having a second attestation chain different than the first attestation chain may attest to a second set of properties in the same software artifact. By providing multiple attestation files for a given software artifact, the software vendor provides a decentralized solution for a variety of customers to validate different properties of the software artifact without minimizing the risk of exposing all available properties of the software artifact to all customers. Software artifact storage 140 is configured to store the software artifacts that the attestation files are attesting to and return software artifacts when requested by attestation manager 120. In some embodiments, attestation manager 120 may receive a software artifact from software vendor 105 and in turn store the software artifact in software artifact storage 140.

Figure 2:
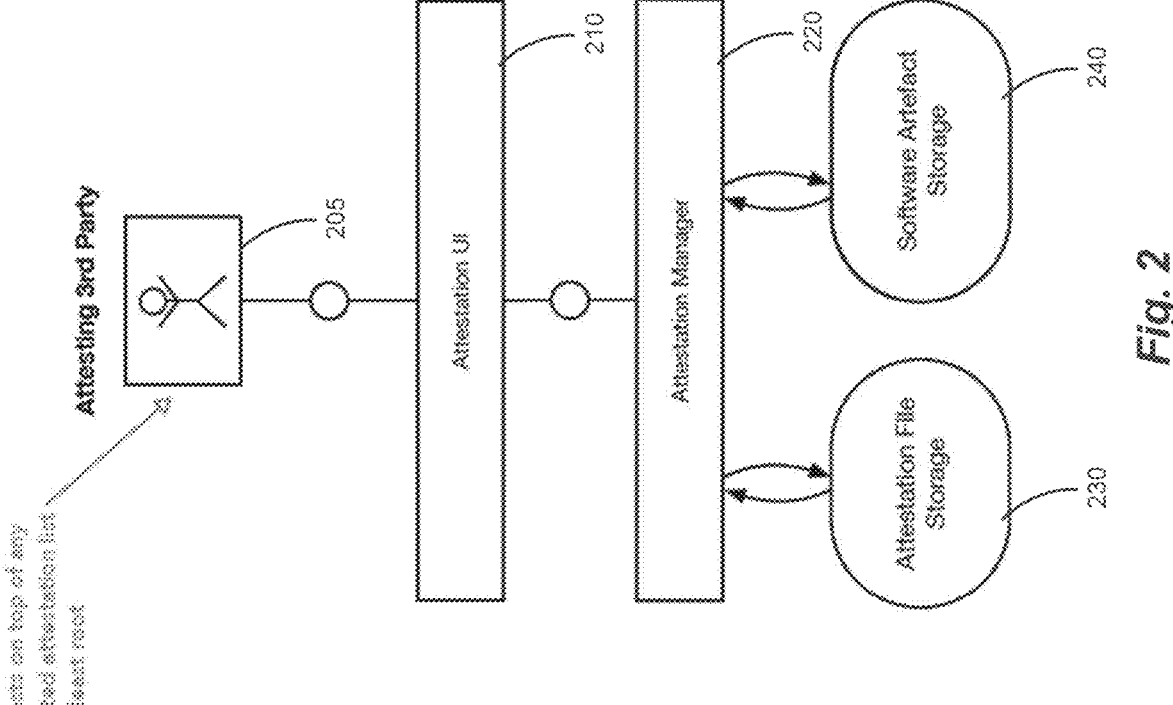
FIG. 2 illustrates a system for adding to an attestation file according to some embodiments.
Figure 2:

FIG. 2 illustrates a system for adding to an attestation file according to some embodiments. An attesting 3P may utilize system 200 to attest on top of any trusted attestation file, thus adding to the attestation chain in the attestation file and increasing the number of attestations in the attestation file. System 200 may be implemented in software and executed on a computing system or computing network, located locally or on the cloud. System 200 includes attestation UI 210, attestation manager 220, attestation file storage 230, and software artifact storage 240. These components may perform similar functions to similarly named components in FIG. 1. In some embodiments, system 200 may be the same as system 100, which means the software vendor or a 3P may deploy system 200 to be used by both software vendors and attesting 3Ps.

Attesting 3P 205 may desire to add one or more attestations to an attestation file. Attestation manager 220 may first retrieve the attestation file from attestation file storage 230 along with the corresponding software artifact from software artifact storage 240. The attestation manager 220 may in turn analyze the attestations in the attestation file to determine if they have not been tampered with. Assuming the attestation file is validated, attestation manager 220 can then add one or more attestations to the attestation file. In some embodiments, an existing attestation file is modified to include the additional attestations. In other embodiments, the existing attestation file remains unmodified and a new attestation file is created.

Figure 3:
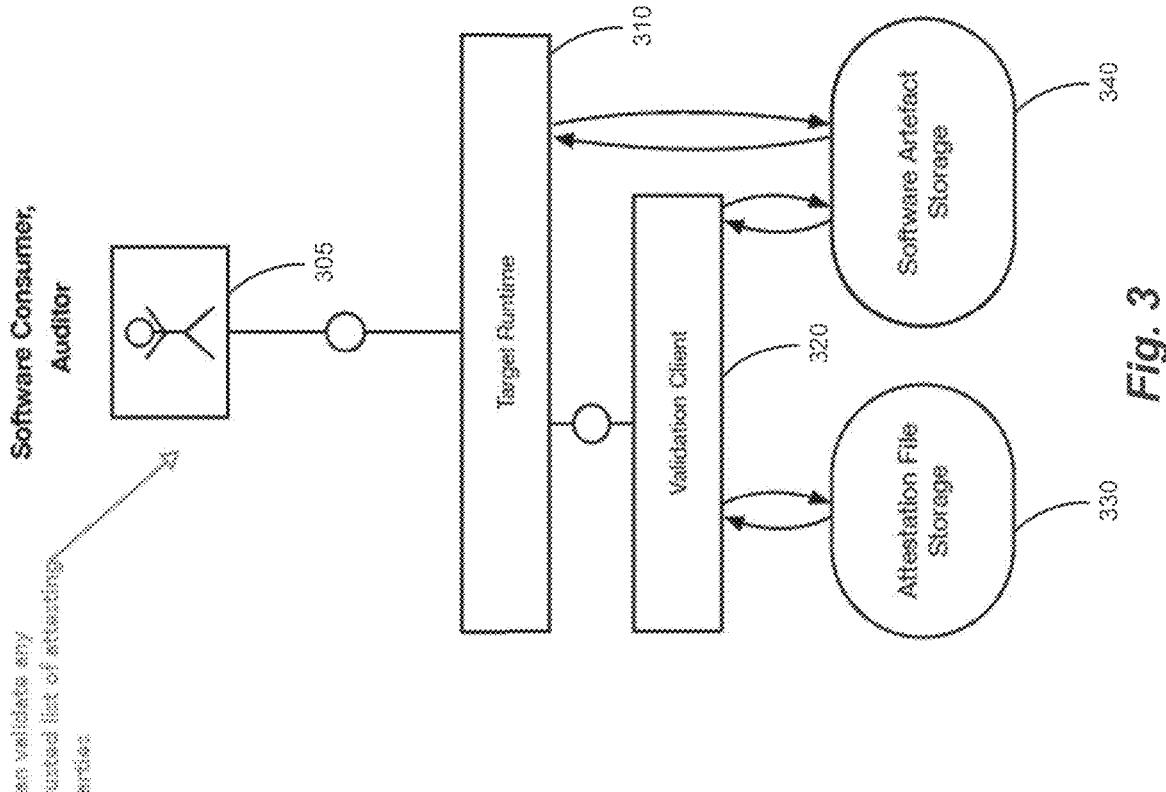
FIG. 3 illustrates a system for validating an attestation file according to some embodiments.
Figure 3:
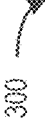

FIG. 3 illustrates a system for validating an attestation file according to some embodiments. A software consumer may access system 300 to either analyze software artifact after a software update, before deployment of the software artifact, or before executing the software artifact in the runtime environment. An auditor may also access system 300 to audit a software artifact for certain properties. System 300 may be implemented in software and executed on a computing system or computing network, located locally or on the cloud. System 300 includes target runtime 310, validation client 320, attestation file storage 330, and software artifact storage 340. In some embodiments, attestation file storage 330 may be the same as attestation file storage 230 of FIG. 2 and attestation file storage 130 of FIG. 1. Similarly in some embodiments, software artifact storage 340 may be the same as software artifact storage 240 of FIG. 2 and software artifact storage 140 of FIG. 1. Target runtime 310 is the environment running the software artifact. A software consumer (305), auditor, or any other party wishing to validate attestations related to the software artifact may call on validation client 320 from target runtime 310. With information about the software artifact such as the version number and the name of the software artifact, software consumer 305 may transmit a request to validation client 320 to validate a given attestation file from attestation file storage 330. Validation client 320 is in communication with attestation file storage 330 and software artifact storage 340 and can retrieve the desired attestation file along with the corresponding software artifact. Validation client 320 can then validate the software artifact and each attestation listed in the file by cryptographically validating the software artifact based on the cryptographic fingerprint stored in the attestation file and also cryptographically validating the signature of each attestation with the use of a public-key encryption scheme.

Figure 4:
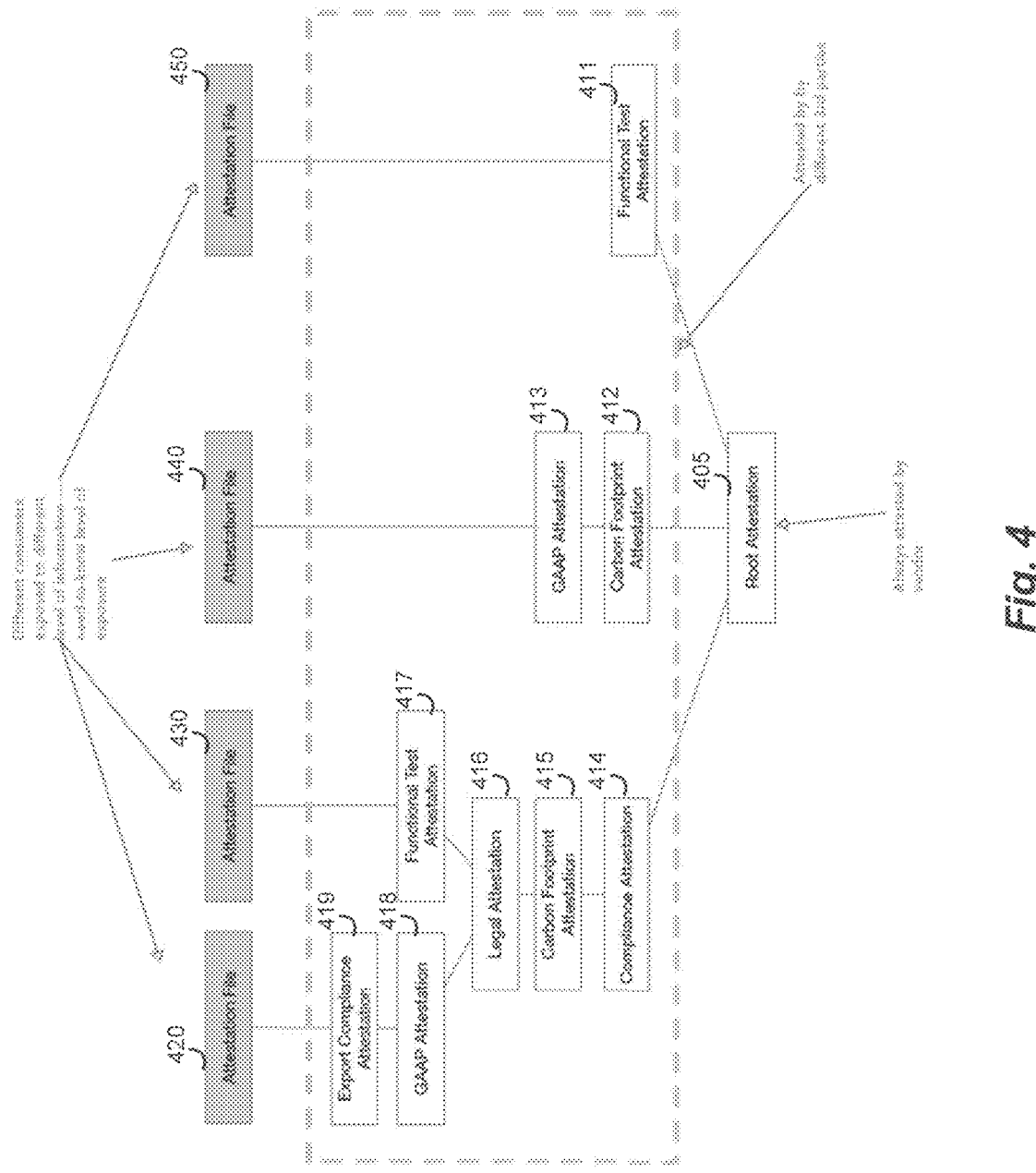
FIG. 4 illustrates a chart of a plurality of attestation files generated from the same root attestation according to some embodiments.

FIG. 4 illustrates a chart of a plurality of attestation files generated from the same root attestation according to some embodiments. As shown, chart 400 includes attestation files 420, 430, 440, and 450. Each attestation file is generated from the root attestation 405 and is for attesting properties of the same software artifact. An attestation manager may generate the attestation files by adding additional attestations to the attestation chain. As shown, each attestation file includes a unique set of attestations. For example, attestation file 450 has an attestation chain that includes root attestation 405 and attestation 411. Similarly, attestation file 440 has an attestation chain that includes root attestation 405, attestation 412, and attestation 413. Similarly, attestation file 430 has an attestation chain that includes root attestation 405, attestation 414, attestation 415, attestation 416, and attestation 417. Similarly, attestation file 420 has an attestation chain that includes root attestation 405, attestation 414, attestation 415, attestation 416, attestation 418, and attestation 419. In some embodiments, the software vendor may manage a list of attestation files to present to each customer. Attestation files presented to a customer may be accessed by the customer. Advantages to maintaining such an access list include adding a layer of privacy. This is because the data structure of the attestation may include information such as the type of attestation, the attestor's name, and also content such as a description of the attestation. This information may be considered confidential and therefore the software vendor may wish to limit access to the attestations.

Figure 5:
FIG. 5 illustrates a workflow for generating attestation files according to some embodiments.
Figure 5:
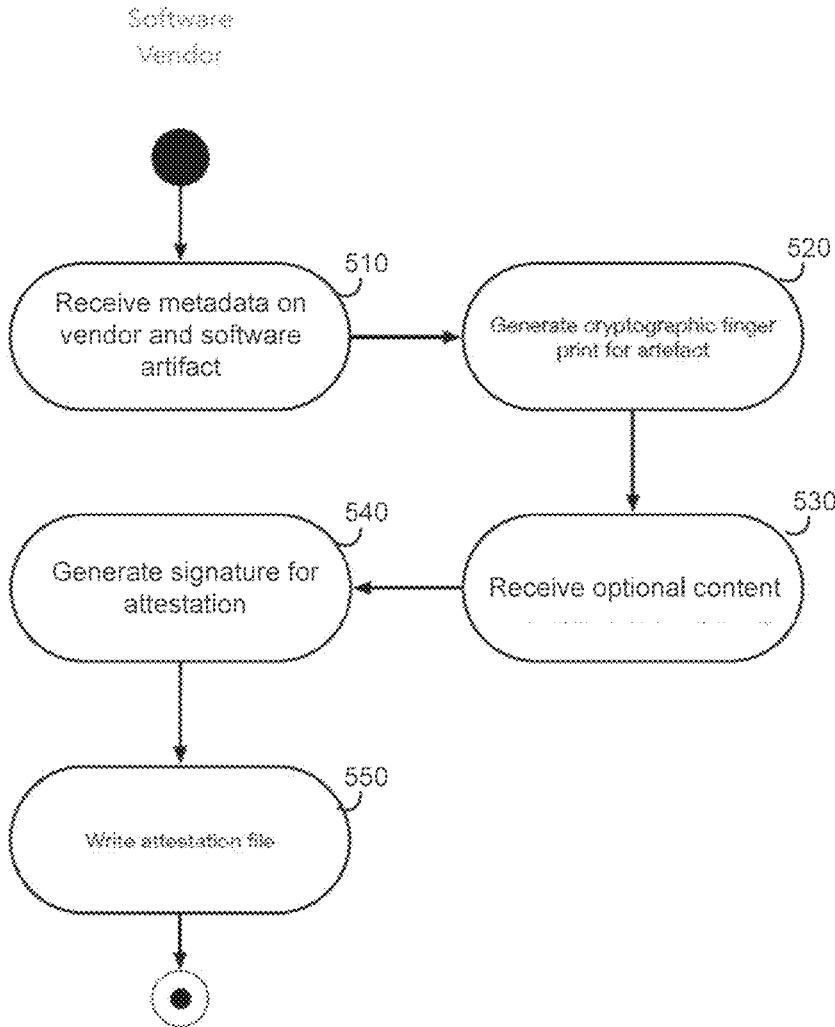
Figure 9:
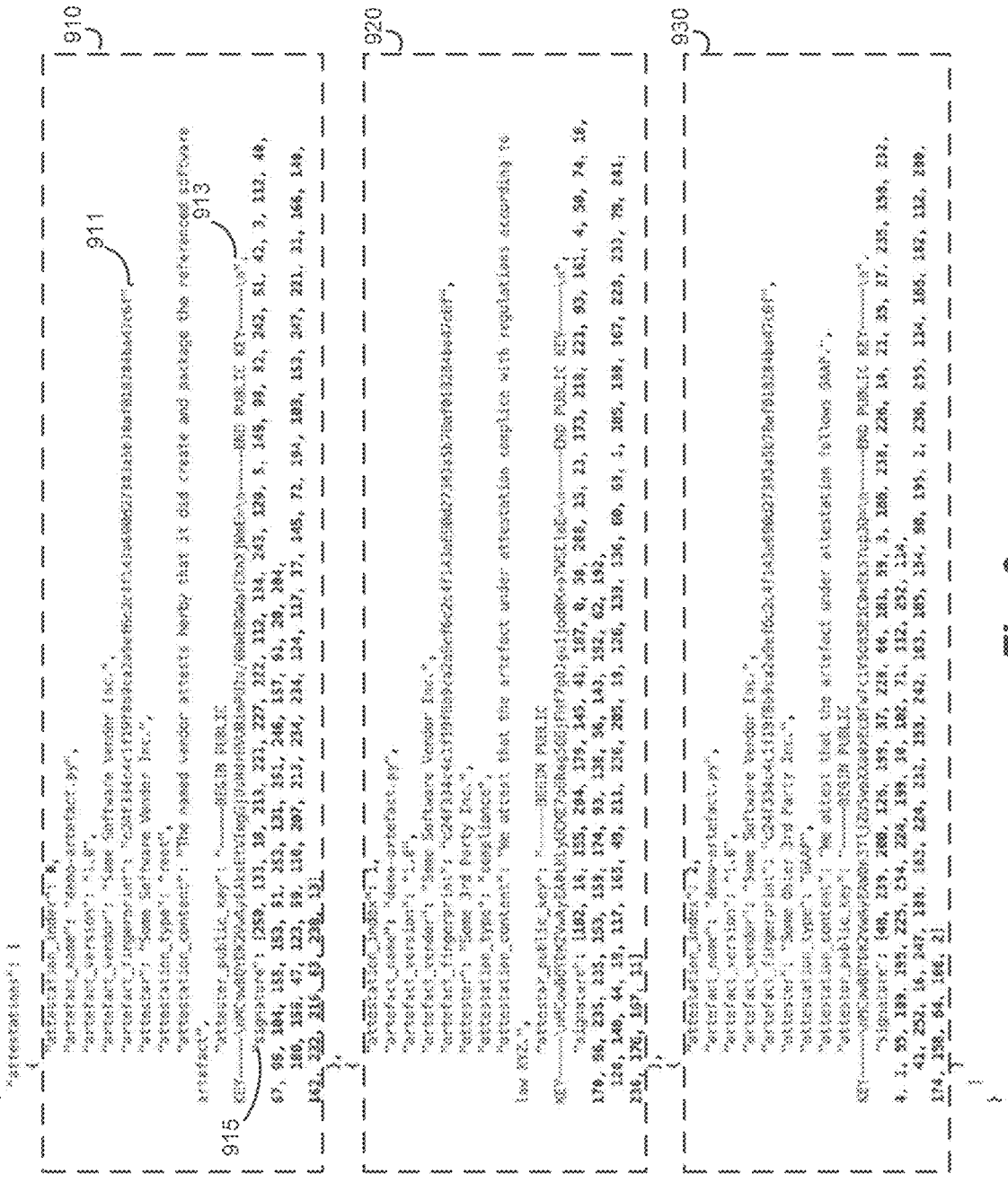
FIG. 9 illustrates an exemplary attestation file according to some embodiments.

FIG. 5 illustrates a workflow for generating attestation files according to some embodiments. Workflow 500 can be implemented as computer readable code, that when executed by a processor, can perform the following steps. Workflow 500 allows a software vendor to generate an attestation file with a root attestation. Workflow 500 begins by receiving, from a software vendor, metadata associated with the vendor and/or the software artifact at step 510. The metadata can include the name of the software vendor, the version of the software, the name of the software, and/or a description of the software. Workflow 500 continues by generating a cryptographic fingerprint for the software artifact at step 520. The fingerprint may be generated by applying a cryptographic hash algorithm on the software artifact. Workflow 500 can then continue by receiving optional content at step 530. The optional content can include information about the software artifact such as release dates and URLS. The optional content can also include information about the software vendor such as software vendor's address, phone number, URL, etc. Once all the optional content has been received, workflow 500 continues by generating a signature for the root attestation at step 540. The signature can be generated by applying a public-key based cryptographic algorithm to the content to be stored in the attestation. This content can include the metadata from step 510, the cryptographic signature generated in step 520, and any additional content received in step 530. In one embodiment, a private key specific to the attestor (here, the software vendor) is applied to the collection of data to generate a signature. In one embodiment, the public-key corresponding to the private key may also be included in the collection of data. This would be advantageous because a party validating the attestation would not need to search for the public-key because the public-key would be in the attestation. In other embodiments the public key is published publicly by the software vendor to be accessible online by the software consumers. After generating the signature, workflow 500 can write the attestation file containing the root attestation in step 550. An example of an attestation file is shown in FIG. 9. In other embodiments, step 510 and 530 may be combined into a single step that occurs prior to generation of the signature in step 540. Workflow 500 can query for metadata and optional content simultaneously, and receive the information simultaneously from the software vendor via the attestation UI.

Figure 6:
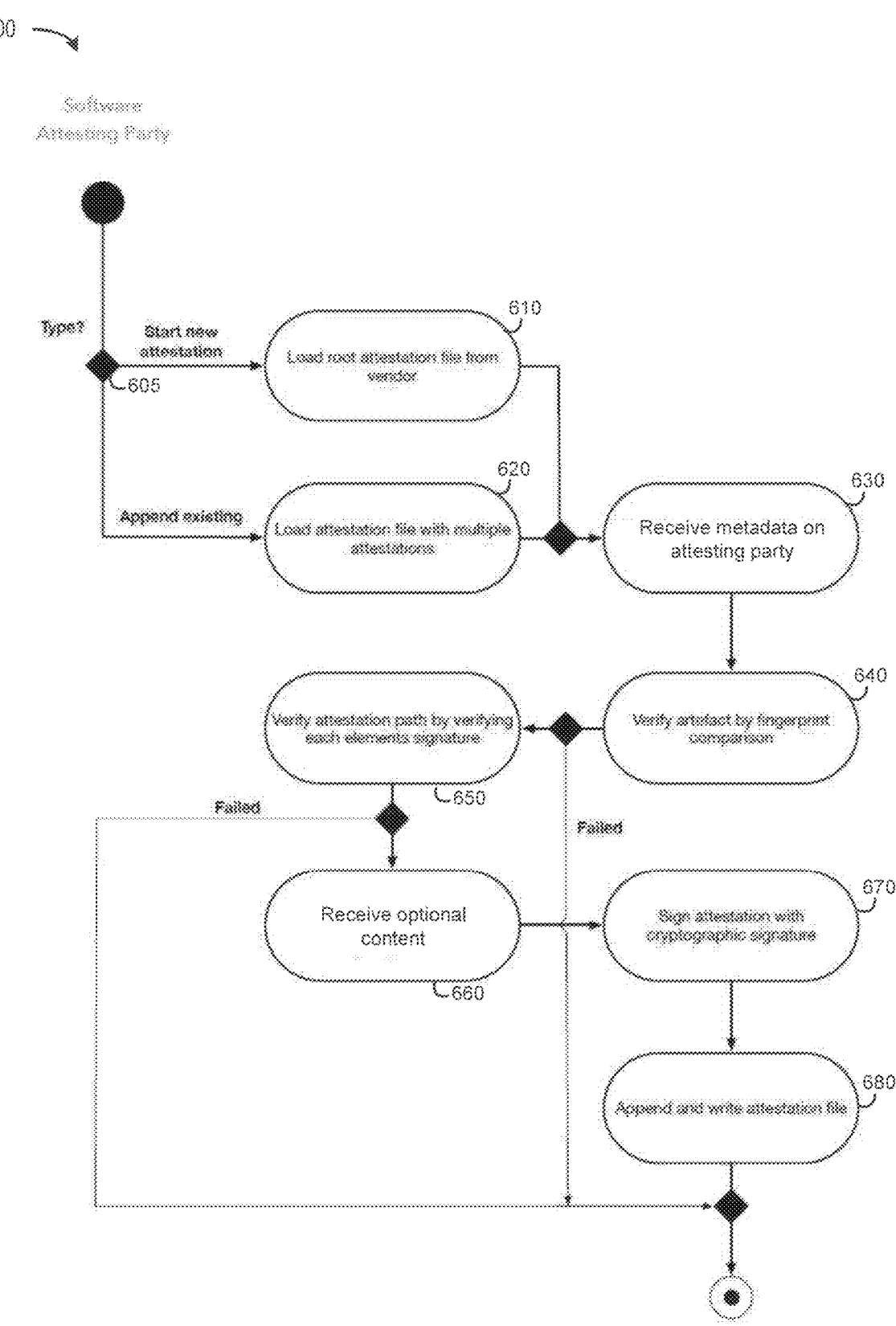
FIG. 6 illustrates a workflow for generating attestation files according to some embodiments.

FIG. 6 illustrates a workflow for generating attestation files according to some embodiments. Workflow 600 can be implemented as computer readable code, that when executed by a processor, can perform the following steps. Workflow 600 allows a software vendor or an attesting 3P to generate a new attestation, which can in turn be appended to an existing attestation file or be used to generate a new attestation file. From a high level, adding an attestation to an attestation file includes two steps—first validating the contents of the existing attestations in the attestation chain and second adding in new attestations once the existing attestations have been validated. To validate an attestation, the contents of the attestation are validated to not have been tampered with through public-key encryption of a signature stored within the attestation. In some embodiments, the software artifact can also be validated as not having been tampered with through a fingerprint comparison. This general verification technique can be applied prior to adding new attestations and be applied to validate a software artifact by a software consumer or auditor. Workflow 600 starts by determining what type of action the attesting 3P wishes to perform at step 605. If the attesting 3P wishes to create a new attestation, then workflow 610 continues by loading (or receiving) a root attestation file at step 610. The root attestation file may be received from the software vendor or a third party that is providing attestation services for the software vendor. A root attestation file is an attestation file where the only attestation in the attestation file is the root attestation. An attesting 3P may in turn add their own attestations to the root attestation, thus creating an attestation chain. If however the attesting 3P wishes to append to an existing attestation, workflow 600 continues by loading an attestation file that contains multiple attestations at step 620.

Regardless of what attestation file was loaded (or received), workflow 600 continues by receiving metadata associated with the attesting 3P at step 630. The metadata can include the name of the attestor, the type of attestation, or a description of the attestation. Workflow 600 may then continue by validating the software artifact at step 640. In one embodiment, the verification may be performed through a fingerprint comparison. This means that a fingerprint of the software artifact is generated and subsequently compared with ground truth fingerprint that is stored in the loaded attestation file. If the fingerprints are not the same, then the software artifact has been tampered with and workflow 600 ends as the verification has failed. Alternatively if the fingerprints are the same, then the software artifact has not been tampered with and workflow 600 continues by validating the attestation path by validating each attestation's signature at step 650. In one embodiment, an attestation can be validated by utilizing a public key to validate a signature stored within the attestation. In some examples, the public key used may be stored within the attestation along with the signature. To validate an attestation with the public key and the signature, a first hash is first calculated from the contents of the attestation. Secondly, the signature is encrypted with the public key to generate a second hash. The first hash is compared with the second hash and if they are the same, then the attestation has not been tampered with. This verification can be performed for each attestation in the attestation chain stored in the attestation file if an attestation file with multiple attestations was loaded or can be performed on the root attestation if the root attestation was loaded. If the attestation path cannot be validated, then workflow 600 ends as the verification has failed. Only when the attestation path and the software artifact are validated can workflow 600 add an attestation to the attestation file. The steps to generate a new attestation include the option of receiving optional content at step 660. The optional attestation content can include test results, compliance notes, or any other information related to the attestation or the attesting party. Once all the content has been provided for the new attestation, workflow 600 can sign the contents of the new attestation with the attesting party's private key to generate a cryptographic signature at step 670. The signature may be stored within the new attestation. Workflow 600 may continue by appending the new attestation to the attestation chain and writing the attestation file at step 680. In one embodiment, workflow 600 may modify the loaded attestation file by appending the attestation chain in the attestation file with the new attestation. In another embodiment, workflow 600 may copy the loaded attestation file, then modify the copied attestation file by adding in the new attestation to its attestation chain. This would preserve the loaded attestation file, which would be advantageous particularly if the loaded attestation file was a root attestation file since other attesting 3Ps may wish to create a new attestation file from the root attestation file. In other embodiments, the steps of validating the fingerprint of step 640 and validating the attestation path of 650 may be performed prior to receiving metadata of step 630 and receiving optional content of 660. This may be advantageous since if either of the validating steps fail, then the attesting 3P is unable to add a new attestation to the attestation file because the attestation file has been corrupted or been tampered with and therefore, the metadata and the optional content does not need to be received. This may slightly streamline the process since the attesting 3P does not need to provide any information until it is confirmed that the attestation file is valid and a new attestation can be added.

Figure 7:
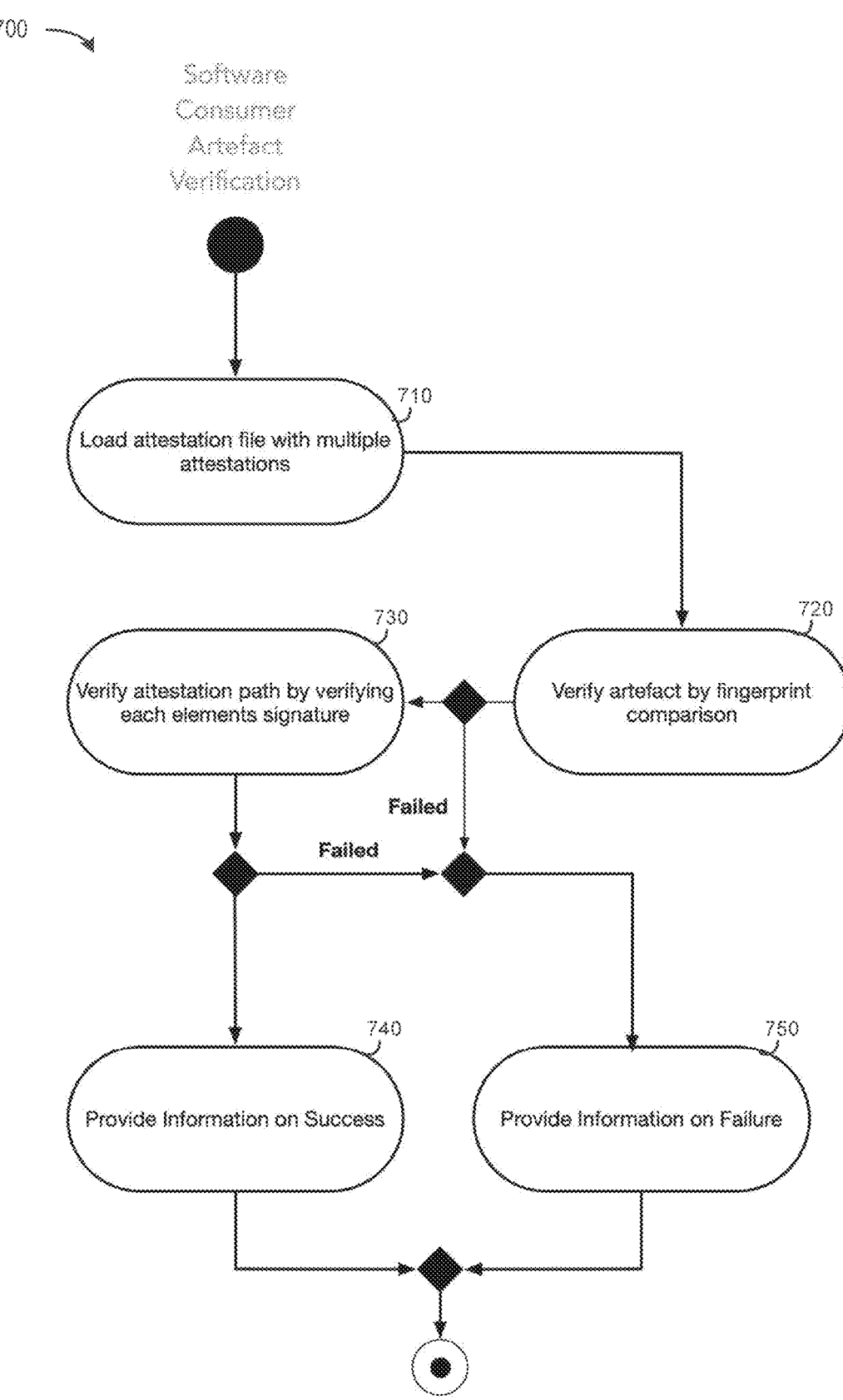
FIG. 7 illustrates a workflow for validating attestation files according to some embodiments.

FIG. 7 illustrates a workflow for validating attestation files according to some embodiments. Workflow 700 can be implemented as computer readable code, that when executed by a processor, can perform the following steps. In some embodiments, workflow 700 can be a part of validation client 320 in FIG. 3 and can be used by a software consumer, auditor, or other 3P to validate attestations in the software artifact. From a high level, validating an attestation file includes validating the software artifact and also validating each attestation in the attestation chain. In one embodiment, validating the software artifact can be performed by fingerprint comparison but in other embodiments, other techniques can be used. Validating the attestations in the attestation chain can include validating that the contents of each attestation has not been tampered with. To do so, a public-key encryption scheme may be applied where the signature generated by the private key is stored within the attestation. Workflow 700 starts by loading or receiving an attestation file that contains multiple attestations at step 710. The multiple attestations may be part of an attestation chain stored within the attestation file. Once the attestation file has been loaded, workflow 700 continues by validating the artifact by fingerprint comparison at step 720. An example of fingerprint comparison has been provided above. If the fingerprint comparison fails, then the software artifact or the attestation file has been tampered with, then workflow 700 continues by providing information on the failure at step 750 and ends. The information of failure can include output from the validation client 320 in FIG. 3 that the software artifact has failed verification because of and details of the verification that failed. Alternatively if the fingerprint comparison succeeds, then workflow 700 continues by validating the attestation path at 730. Validating the attestation path is synonymous with validating the attestation chain and thus, each attestation in the attestation chain is validated by applying a public-key encryption scheme to the contents of the attestation and comparing it to a signature stored within the attestation. In one embodiment, the public-key encryption scheme may be applied to all of the contents of the attestation except for the signature. If any of the attestations in the attestation chain fail verification, then workflow 700 continues by providing information on failure at step 750. Alternatively, if all attestations in the attestation chain are validated, then workflow 700 continues by providing information of success at step 740. The information of success can include output from the validation client 320 in FIG. 3 that the software artifact has been successfully validated. Although workflow 700 illustrates the software artifact verification occurring prior to the attestation path verification, in practice the ordering can also be reversed.

Figure 8:
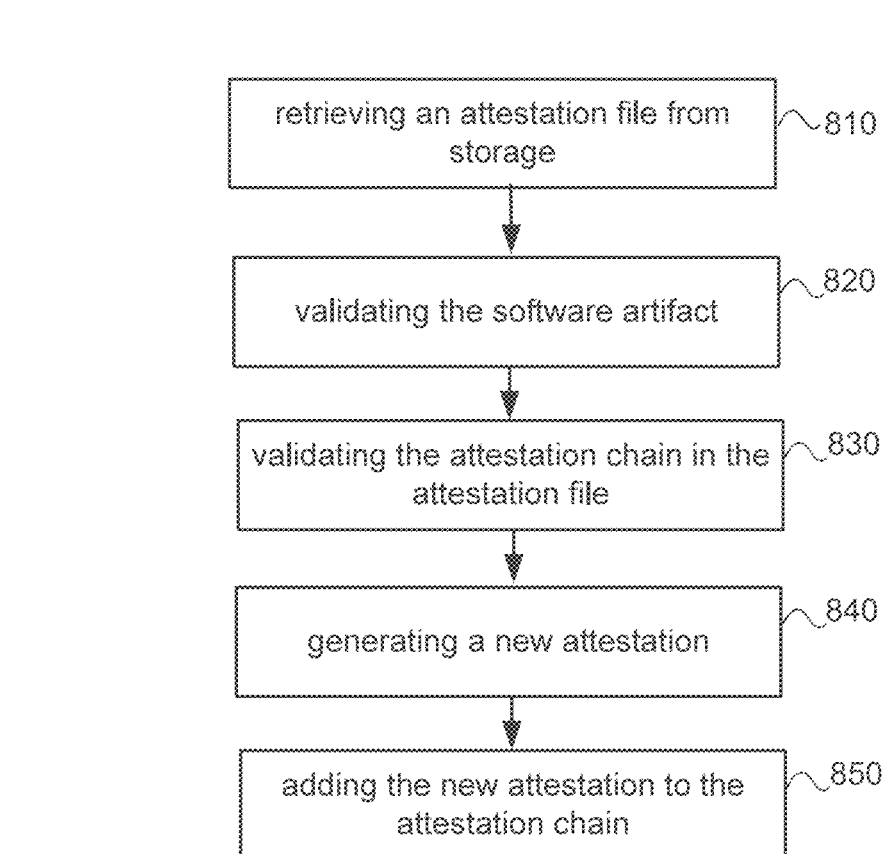
FIG. 8 illustrates a workflow for adding new attestations to an attestation file according to some embodiments.

FIG. 8 illustrates a workflow for adding new attestations to an attestation file according to some embodiments. Workflow 800 can be implemented as computer readable code, that when executed by a processor, can perform the following steps. In some embodiments, workflow 800 can be a part of attestation manager 220 of FIG. 2. Workflow 800 begins by retrieving an attestation file from storage at 810. The attestation file may include one or more attestations, each attestation attesting that a software artifact satisfies a property. In one embodiment, the attestation file retrieved can be a root attestation file generated by the software vendor. In another embodiment, the attestation file retrieved can be an attestation file with multiple attestations. The attestation file may be retrieved from an attestation file storage, such as attestation file storage 130 of FIG. 1.

Workflow 800 continues by validating the software artifact at 820. In one embodiment, validating the software artifact includes applying a cryptographic algorithm on the software artifact to generate a cryptographic fingerprint and comparing the generated cryptographic fingerprint with a cryptographic fingerprint stored within an attestation from the attestation file. If the cryptographic fingerprints are the same, then the software artifact is validated. Workflow 800 then continues by validating the attestation chain in the attestation file at step 830. In one embodiment, validating the attestation chain can include validating each attestation in the attestation chain separately. Validation of an attestation can include applying a public-key encryption scheme on the contents of the attestation to determine whether the generated cryptographic signature is the same as the cryptographic signature stored within the attestation. If the signatures are the same, then the attestation has not been corrupted or tampered with. If however the signatures are not the same, then the attestation is not validated and the workflow ends. An attesting 3P can start over by selecting a different attestation file, or maybe even the root attestation file, to attest. This can be performed for each attestation in the attestation chain. If all the software artifact and the attestation chain are successfully validated, workflow 800 continues by generating a new attestation at step 840. Once the new attestation is generated, it can be added to the attestation chain at step 850.

FIG. 9 illustrates an exemplary attestation file according to some embodiments. Attestation file 900 includes three attestations—attestation 910, attestation 920, and attestation 930. Each attestation includes an attestation index that starts with 0 for the root attestation and increments for each subsequent attestation added to the attestation chain. As shown here, attestation 910 is the root attestation and includes information about the attestation such as the name of the software artifact, the version number of the software artifact, the name of the software vendor, and a cryptographic fingerprint for the software artifact. Attestation 910 further includes information about the attestor, such as the name of the attestor, the attestation type, and attestation content containing a description of the attestation. A public key 913 from the attestor and a cryptographic signature 915 are also included in attestation 910. Attestation 920 includes the same data fields and as shown, has an attestation type of "compliance." Similarly, attestation 930 includes the same data fields as shown, has an attestation type of "GAAP." While it is shown here that attestations 910, 920, and 930 have the same data structure, in other embodiments only the root attestation includes information about the software artifact since the root attestation is generated by the software vendor, the party deploying the software artifact. This may result in more efficient storage for the attestation file.

Figure 10:
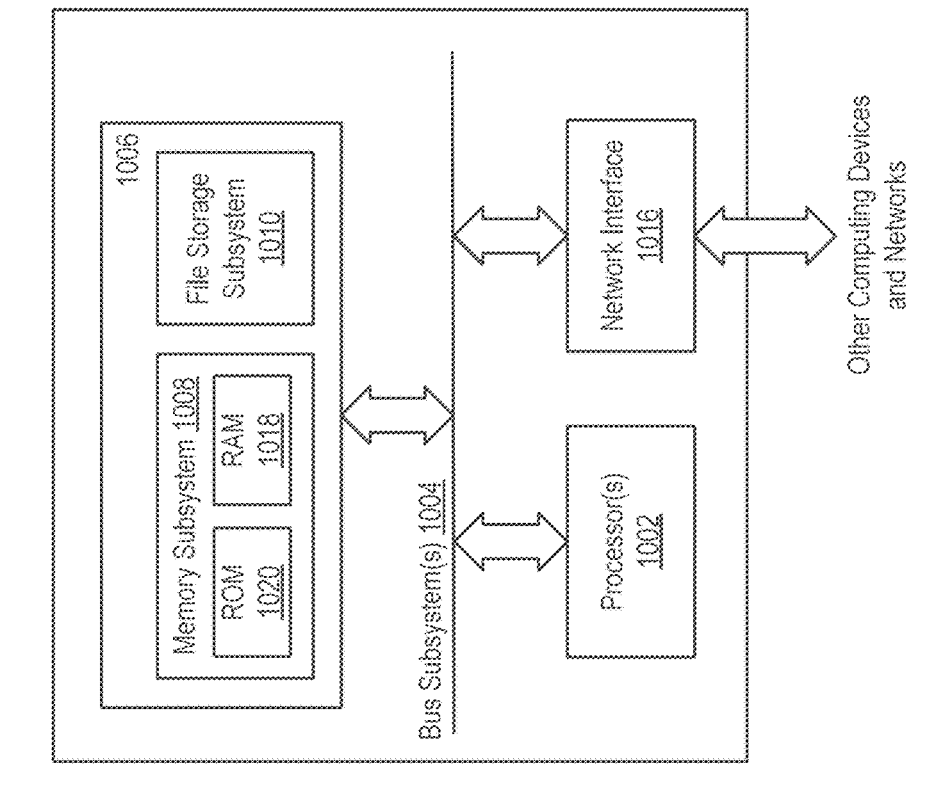
FIG. 10 depicts a simplified block diagram of an example computer system, which can be used to implement some of the techniques described in the foregoing disclosure.

FIG. 10 depicts a simplified block diagram of an example computer system, which can be used to implement some of the techniques described in the foregoing disclosure. As shown in FIG. 10, system 1000 includes one or more processors 1002 that communicate with several devices via one or more bus subsystems 1004. These devices may include a storage subsystem 1006 (e.g., comprising a memory subsystem 1008 and a file storage subsystem 1010) and a network interface subsystem 1016. Some systems may further include user interface input devices and/or user interface output devices (not shown).

Bus subsystem 1004 can provide a mechanism for letting the various components and subsystems of system 1000 communicate with each other as intended. Although bus subsystem 1004 is shown schematically as a single bus, alternative embodiments of the bus subsystem can utilize multiple buses.

Network interface subsystem 1016 can serve as an interface for communicating data between system 1000 and other computer systems or networks. Embodiments of network interface subsystem 1016 can include, e.g., Ethernet, a Wi-Fi and/or cellular adapter, a modem (telephone, satellite, cable, etc.), and/or the like.

Storage subsystem 1006 includes a memory subsystem 1008 and a file/disk storage subsystem 1010. Subsystems 1008 and 1010 as well as other memories described herein are examples of non-transitory computer-readable storage media that can store executable program code and/or data that provide the functionality of embodiments of the present disclosure.

Memory subsystem 1008 comprise one or more memories including a main random access memory (RAM) 1018 for storage of instructions and data during program execution and a read-only memory (ROM) 1020 in which fixed instructions are stored. File storage subsystem 1010 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that system 1000 is illustrative and many other configurations having more or fewer components than system 1000 are possible.

The above description illustrates various embodiments of the present invention along with examples of how aspects of the present invention may be implemented. The above examples and embodiments should not be deemed to be the only embodiments and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

FURTHER EXAMPLES

Each of the following non-limiting features in the following examples may stand on its own or may be combined in various permutations or combinations with one or more of the other features in the examples below. In various embodiments, the present disclosure may be implemented as a processor or method.

In some embodiments the present disclosure includes a method of retrieving an attestation file from storage, the attestation file including a first attestation that attests a software artifact satisfies a first property, the first attestation including a first cryptographic fingerprint associated with the software artifact and a first cryptographic signature; validating the software artifact; validating contents of the first attestation; and in response to successfully validating the contents of the first attestation and validating the software artifact, generating a second attestation that the software artifact satisfies a second property and adding the second attestation to the attestation file.

In one embodiment, validating the software artifact includes applying a cryptographic algorithm on the software artifact to generate a second cryptographic fingerprint; and comparing the first cryptographic fingerprint and the second cryptographic fingerprint.

In one embodiment, the software artifact is validated when the first cryptographic fingerprint and the second cryptographic fingerprint are the same.

In one embodiment, the first property is one of a functional requirement, business requirement, and compliance requirement of the software artifact.

In one embodiment, validating the contents of the first attestation includes applying a first public-key to the contents of the first attestation other than the first cryptographic signature stored within the first attestation to generate a second cryptographic signature and comparing the first cryptographic signature and the second cryptographic signature.

In one embodiment, the first cryptographic signature was previously generated by applying a first private key that corresponds with the first public-key to the contents of the first attestation other than the first cryptographic signature.

In one embodiment, the first attestation further includes the first public-key.

In one embodiment, the first attestation further includes metadata describing the first attestation.

In one embodiment, the metadata includes a name of a first attestor and a first attestation type.

In one embodiment, the first attestation further includes metadata describing the software artifact.

In one embodiment, generating the second attestation includes receiving metadata describing the second attestation; generating a second cryptographic signature based on the metadata and the software artifact; writing the metadata, the second cryptographic signature, and the first cryptographic fingerprint in the second attestation.

In some embodiments, the present disclosure includes a system comprising one or more processors; a non-transitory computer-readable medium storing a program executable by the one or more processors, the program comprising sets of instructions for: retrieving an attestation file from storage, the attestation file including a first attestation that attests a software artifact satisfies a first property, the first attestation including a first cryptographic fingerprint associated with the software artifact and a first cryptographic signature; validating the software artifact; validating contents of the first attestation; and in response to successfully validating the contents of the first attestation and validating the software artifact, generating a second attestation that the software artifact satisfies a second property and adding the second attestation to the attestation file.

In some embodiments, the present disclosure includes a non-transitory computer-readable medium storing a program executable by one or more processors, the program comprising sets of instructions for: retrieving an attestation file from storage, the attestation file including a first attestation that attests a software artifact satisfies a first property, the first attestation including a first cryptographic fingerprint associated with the software artifact and a first cryptographic signature; validating the software artifact; validating contents of the first attestation; and in response to successfully validating the contents of the first attestation and validating the software artifact, generating a second attestation that the software artifact satisfies a second property and adding the second attestation to the attestation file.

What is claimed is:

1. A method, comprising:

retrieving an attestation file from storage, the attestation file including a first attestation that attests a software artifact satisfies a first property, the first attestation including a first cryptographic fingerprint associated with the software artifact and a first cryptographic signature;

validating the software artifact, wherein validating the software artifact includes:

applying a cryptographic algorithm on the software artifact to generate a second cryptographic fingerprint; and comparing the first cryptographic fingerprint and the second cryptographic fingerprint;

validating contents of the first attestation, wherein validating the contents of the first attestation includes applying a first public-key to the contents of the first attestation other than the first cryptographic signature stored within the first attestation to generate a second cryptographic signature and comparing the first cryptographic signature and the second cryptographic signature; and in response to successfully validating the contents of the first attestation and validating the software artifact, generating a second attestation that the software artifact satisfies a second property and adding the second attestation to the attestation file.

2. The method as in claim 1, wherein the software artifact is validated when the first cryptographic fingerprint and the second cryptographic fingerprint are the same.

3. The method as in claim 1, wherein the first property is one of a functional requirement, business requirement, and compliance requirement of the software artifact.

4. The method as in claim 1, wherein the first cryptographic signature was previously generated by applying a first private key that corresponds with the first public-key to the contents of the first attestation other than the first cryptographic signature.

5. The method as in claim 1, wherein the first attestation further includes the first public-key.

6. The method as in claim 1, wherein the first attestation further includes metadata describing the first attestation.

7. The method as in claim 6, wherein the metadata includes a name of a first attestor and a first attestation type.

8. The method as in claim 1, wherein the first attestation further includes metadata describing the software artifact.

9. The method as in claim 1, wherein generating the second attestation includes:

receiving metadata describing the second attestation;

generating a second cryptographic signature based on the metadata and the software artifact; and writing the metadata, the second cryptographic signature, and the first cryptographic fingerprint in the second attestation.

10. A system comprising:

one or more processors;

a non-transitory computer-readable medium storing a program executable by the one or more processors, the program comprising sets of instructions for:

retrieving an attestation file from storage, the attestation file including a first attestation that attests a software artifact satisfies a first property, the first attestation including a first cryptographic fingerprint associated with the software artifact and a first cryptographic signature;

validating the software artifact, wherein validating the software artifact includes:

applying a cryptographic algorithm on the software artifact to generate a second cryptographic fingerprint; and comparing the first cryptographic fingerprint and the second cryptographic fingerprint;

validating contents of the first attestation, wherein validating the contents of the first attestation includes applying a first public-key to the contents of the first attestation other than the first cryptographic signature stored within the first attestation to generate a second cryptographic signature and comparing the first cryptographic signature and the second cryptographic signature; and in response to successfully validating the contents of the first attestation and validating the software artifact, generating a second attestation that the software artifact satisfies a second property and adding the second attestation to the attestation file.

11. The system of claim 10, wherein the software artifact is validated when the first cryptographic fingerprint and the second cryptographic fingerprint are the same.

12. The system of claim 10, wherein the first cryptographic signature was previously generated by applying a first private key that corresponds with the first public-key to the contents of the first attestation other than the first cryptographic signature.

13. The system of claim 10, wherein the first attestation further includes the first public-key.

14. A non-transitory computer-readable medium storing a program executable by one or more processors, the program comprising sets of instructions for:

retrieving an attestation file from storage, the attestation file including a first attestation that attests a software artifact satisfies a first property, the first attestation including a first cryptographic fingerprint associated with the software artifact and a first cryptographic signature;

validating the software artifact, wherein validating the software artifact includes:

applying a cryptographic algorithm on the software artifact to generate a second cryptographic fingerprint; and comparing the first cryptographic fingerprint and the second cryptographic fingerprint;

validating contents of the first attestation, wherein validating the contents of the first attestation includes applying a first public-key to the contents of the first attestation other than the first cryptographic signature stored within the first attestation to generate a second cryptographic signature and comparing the first cryptographic signature and the second cryptographic signature; and in response to successfully validating the contents of the first attestation and validating the software artifact, generating a second attestation that the software artifact satisfies a second property and adding the second attestation to the attestation file.

15. The non-transitory computer-readable medium of claim 14, wherein the software artifact is validated when the first cryptographic fingerprint and the second cryptographic fingerprint are the same.

* * * * *